United States Patent [19]

Stockton

[11] Patent Number: 4,560,056

[45] Date of Patent: Dec. 24, 1985

[54] FOUR-WHEEL DRIVE CLUTCH LUBRICATION SYSTEM

[75] Inventor: Thomas R. Stockton, Ann Arbor, Mich.

[73] Assignee: Ford Motor Company, Dearborn, Mich.

[21] Appl. No.: 553,205

[22] Filed: Nov. 18, 1983

[51] Int. Cl.[4] .................................................. F16H 57/04
[52] U.S. Cl. .................................. 192/113 B; 192/48.8; 74/467; 184/6.12; 184/11.1
[58] Field of Search .................. 192/113 B, 48.8, 49, 192/50; 184/6.12, 11.1, 11.2, 11.3; 74/650, 467; 418/94, 88

[56] References Cited

U.S. PATENT DOCUMENTS

| | | | |
|---|---|---|---|
| 2,684,140 | 7/1954 | Warn | 192/47 X |
| 2,884,101 | 4/1959 | Warn | 192/44 |
| 3,055,471 | 9/1962 | Warn | 192/45 X |
| 3,124,972 | 3/1964 | Seliger et al. | 74/650 |
| 3,173,309 | 3/1965 | Seliger | 74/650 |
| 3,182,527 | 5/1965 | Bryan | 184/11.1 X |
| 3,513,476 | 5/1970 | Monden et al. | 418/88 X |
| 3,581,597 | 4/1970 | Reiersgaard | 74/650 |
| 3,700,082 | 10/1972 | Schwab | 192/50 |
| 3,741,343 | 6/1973 | Lindenfeld et al. | 192/113 B X |
| 3,935,753 | 2/1975 | Williams | 74/650 |

Primary Examiner—Leonard E. Smith
Attorney, Agent, or Firm—Frank G. McKenzie; Donald J. Harrington

[57] ABSTRACT

A drive mechanism of a front-wheel drive vehicle adapted to selectively drive the rear wheels includes an overrunning clutch mounted coaxially with the rear axleshafts. The clutch and drive mechanism are lubricated by way or ports formed in the casing that carry lubricant thrown radially outward by a bevel pinion rotating through the oil bath to a chamber that is baffled to permit only a portion of the lubricant to flow from the chamber through bearings that support the rear axleshafts. Helical recesses are formed on a portion of the axleshafts and pump lubricant from the chamber axially inward into interior abutting surfaces of members that rotate relative to adjacent members. The pressure head produced by the hydraulic pump, according to this invention, forces the fluid through the roller-race assembly and through spline connections radially outward against a drag connection between the race and a ground connector. The lubricant is pumped radially outward and carried in that direction toward the oil ports formed in the casing by a bevel pinion rotating within the oil sump.

14 Claims, 6 Drawing Figures

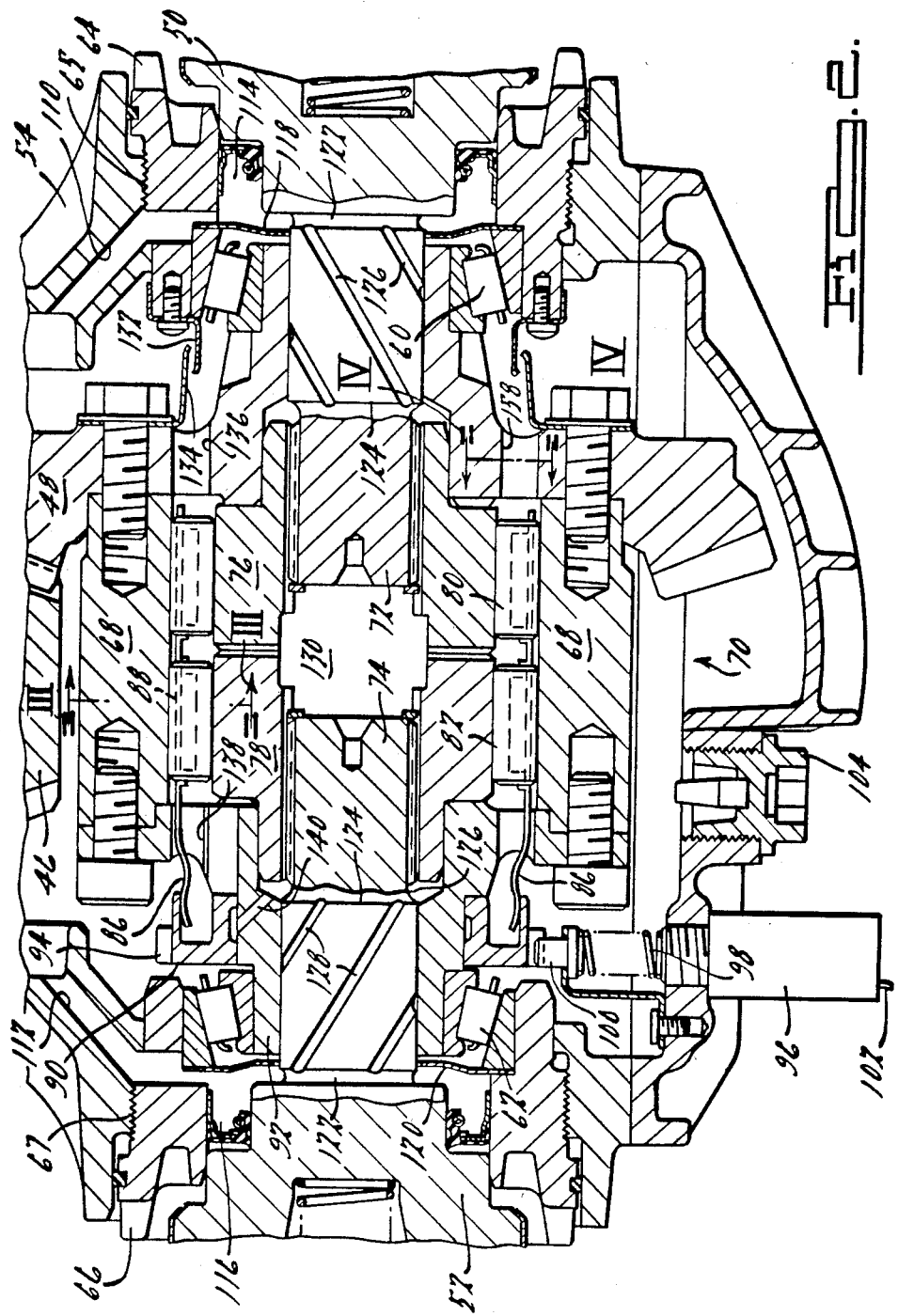

FOUR-WHEEL DRIVE CLUTCH LUBRICATION SYSTEM

BACKGROUND OF THE INVENTION

1. Field of the Invention

The present invention relates generally to the field of four-wheel drive power transmission systems for vehicles, particularly to a system for lubricating the mating surfaces of an overrunning clutch and axleshafts, and more particularly to such systems that transmit power to the first of two sets of wheels while the wheel sets have the same speed, and to the other set of wheels when the speed of the first wheel set exceeds that of the other wheel set.

2. Description of the Prior Art

Drive mechanisms have been devised that transmit power to only one set of wheels when the four wheels of the vehicle are rotating at nearly the same speed. However, when the driven wheels begin to overrun, the nondriven wheels are driveably connected to the transmission and become driven, whereas the driving wheels in this condition are no longer supplied with power. Sometimes this action is done by providing the nondriven set of wheels with an overrunning clutch and by gearing the clutch such that it becomes engaged when a predetermined speed differential between the driving and nondriven wheels occurs. This requires that the overrunning clutch be manually locked in order to obtain four-wheel drive when the vehicle is driven in reverse or when engine braking is required. Other systems use a conventional differential to allow the front and rear axleshafts to deliver power while rotating at different speeds. These systems generally require a manual lock-up device to prevent excessive wheel spin when encountering surfaces on which the wheels may slip.

Usually in mechanisms of this type, centrifugal force can be used as a medium for carrying lubricant from the sump to the surfaces of the clutch due to the action of the gear continuously rotating through the oil sump. However, the inner surfaces between the axleshafts and the inner races of the clutch to which the axleshaft is driveably connected, and surfaces adjacent the inner race that rotate at speeds relative to those of the inner race are not supplied with lubricant because these surfaces neither pass through the oil sump nor are they accessible to the outer surfaces on which the oil bath readily flows. Nonetheless, there is a need to protect mating surfaces that rotate at substantially different speeds continuously as the vehicle is driven.

SUMMARY OF THE INVENTION

The four-wheel drive mechanism, according to this invention, is provided with a casing, in which a quantity of lubricating hydraulic fluid is contained, and an overrunning clutch, mounted coaxially with driveshafts that extend within the casing. A set of bevel pinions transmits power from a transmission to the outer race of the clutch. One of the gears of the gear set rotates continuously through the oil as the vehicle moves the clutch. The clutch includes inner races, driveably connected by splines to the ends of the axleshafts, and a cage-roller assembly, located on the inner races and movable to a position where the rollers contact the inner surface of the outer race. Relative rotation is possible between the inner races and a ground connector, and between a spring bias portion of the clutch roller-cage assembly and surfaces of a ground connector that are mounted on the outer race of the clutch.

Formed within the casing are several passages that carry hydraulic fluid radially outward from the surface of the bevel gear as it rotates through the oil bath. These passages direct lubricant to chambers that supply fluid around a baffle and through bearings that support the axleshafts. Each axleshaft is formed with multiple helical slots on its outer surface that rotate between cylindrical surfaces formed on the bevel gear and outer race assembly. Hydraulic fluid from the chambers flows into the helical slots and is pumped by rotation of the axleshafts axially inward from the chamber to a recess located between the inner and outer races of the clutch. This recess is a source from which hydraulic fluid is pumped by the helical slots through the spline connection between the inner race and the axleshafts and from there radially outward through the cage-roller clutch assembly. Oil exiting the cage-roller assembly passes through passages formed on the bevel gear and outer race. An additional passage supplies hydraulic fluid from the inner chamber from which it is pumped through action of the rotating helical slots to an annular passage formed on the inner race of the ground connector. Centrifugal force throws the hydraulic fluid radially outward toward the passage formed on the casing, through which it is redirected to the lubricating circuit according to this invention.

BRIEF DESCRIPTION OF THE DRAWING

FIG. 2 is a cross section through the plane containing the axes of the rear driveshaft and rear axleshafts showing the components of the rear drive clutch mechanism.

DESCRIPTION OF THE PREFERRED EMBODIMENT

Figure 1:
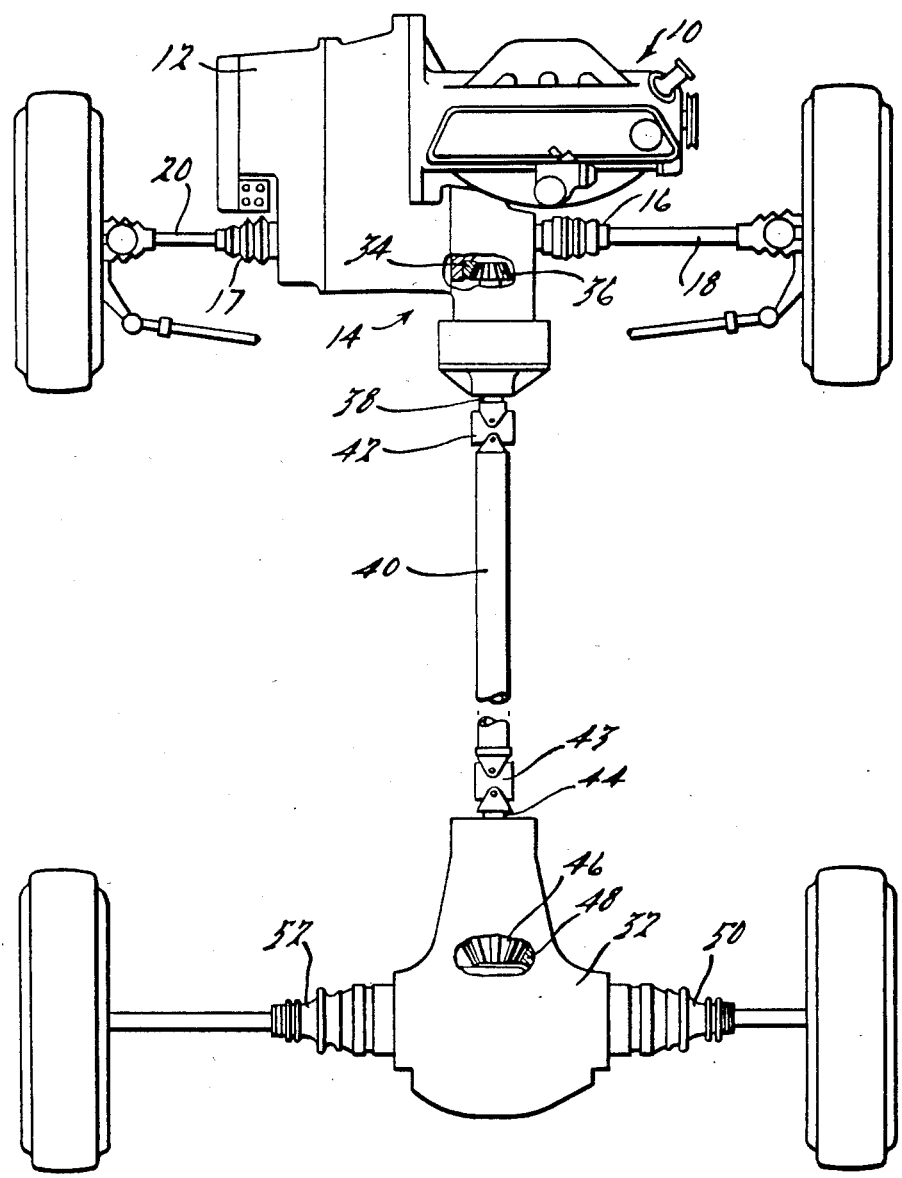
FIG. 1 is a plan view showing the power transmitting components of a vehicle driveline for use with this invention.

Referring first to FIG. 1, a transversely mounted engine 10 is driveably connected to an automatic or manually operated transmission 12 whose output is connected through a differential mechanism 14 and inner constant velocity joints 16, 17 to the front axle 18, 20 of a vehicle. The final drive mechanism of the transmission includes a rotatably mounted differential casing driveably connected to the output shaft of the transmission having a differential spindle, bevel pinions rotatably mounted on the spindle, and side bevel gears intermeshing with the bevel pinions and fixed rigidly to the axleshafts 18, 20. Differential 14 includes bevel pinion 34 in mesh with bevel pinion 36, which is formed integrally with a driveshaft 40 that extends rearward from the front axle toward the rear axleshafts. The rear driveshaft 40 is connected by a universal joint 42 to a driveshaft 38 at the front end, and by universal joint 43 at the rear end to driveshaft 44. Shaft 44 is formed integrally with a bevel pinion 46, which is in continuously meshing engagement with a bevel gear 48 adapted to rotate about the axis of the rear axle shafts 50, 52. Gears 34, 36, 46 and 48 are sized such that the gear ratio produced by them causes gear 48 to be driven five to ten percent slower than the speed of the front axleshafts 18, 20 when the vehicle is traveling straight ahead and there is no slippage of the wheels.

Referring now to FIG. 2, the rear drive mechanism of the four-wheel drive system, according to the present invention, includes a housing 54 in which bearings that support the rear driveshaft 44 and bearings 60 and 62 that support the right and left rear axleshafts 50, 52 are fitted. Bearing adjustment nuts 64 and 66 engage threads formed in housing 54 and bear against the outer races of bearings 60, 62. In this way they are used to adjust the axial position of the bearings relative to the axis of driveshaft 44 and to control the degree of meshing engagement of pinion 46 with gear 48.

Bevel gear 48 is connected to the outer race 68 of an overrunning clutch 70 by means of which power is transmitted to the rear axleshafts from driveshaft 44. Each of the rear axleshafts has a splined portion 72, 74 that is driveably connected through the spline to the inner races 76, 78 of the overrunning clutch 70. First and second sets of clutch rollers 80, 82 are located between the outer surfaces of the inner races and the inner surface of the outer race on which multiple cammed surfaces are formed. The sets of clutch rollers are located within first and second sets of apertures 87 (seen best in FIG. 3) formed in the surface of the cage 88. Extending axially outward from the race are multiple springs 86 that are biased radially inward from their undeflected positions into contact with a surface of a ground connector 90 that is selectively connectable to and disconnectable from the casing 54. Connector 90 is carried on a surface of an end cover 92 that is bolted to the outer race 68. The outer surface of ground connector 90 is formed with teeth 94 between which the stem 100 of an electrical solenoid 96 is biased by a compression spring 98. When the winding of solenoid 96 is energized, the solenoid is energized from a source of electrical power through feedlines 102 provided the shift selector of the transmission is moved to the neutral position.

A plug 104 is connected by a screw thread to the transmission casing in an area where the transmission fluid within the casing can flow over the interior surface of the plug. The plug is equipped with a permanent magnet by means of which metal particles carried by the transmission fluid become fixed to the plug.

Figure 3A:
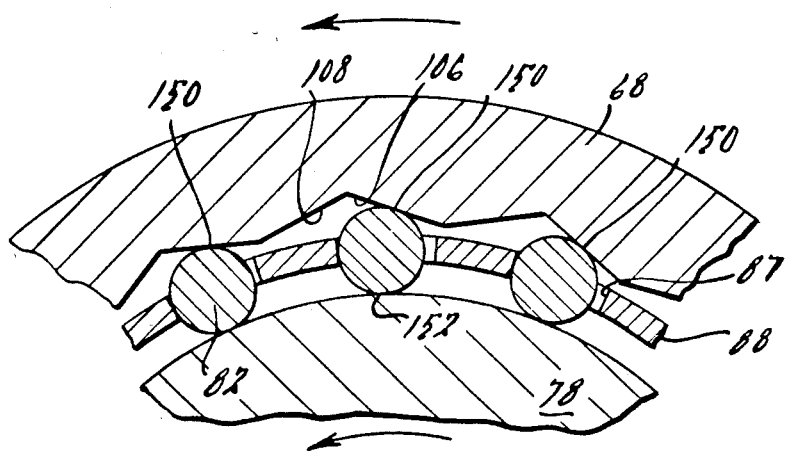
FIG. 3A is a cross section taken at plane III—III of FIG. 2 showing the rollers in contact with the surfaces of the clutch races in the forward drive position.

Referring now to FIG. 3, a cross section through the outer race, inner race and cage assembly shows that the inner surface of the outer race is formed with multiple ramp surfaces 106, 108 formed in pairs, on which each roller makes contact. The apertures of the cage are larger than the diameter of the rollers so that the cage can rotate with respect to the rollers between the position shown in FIG. 3A, where the cage contacts the rollers and forces them into contact with the trailing ramp surface 106 of the outer race, and the outer surface of the inner races. This is the position of various members of the overrunning clutch when the clutch is transmitting power from the outer race 68 to the inner race 76, 78.

As bevel gear 48 rotates, it is wetted by passing through a bath of hydraulic lubricant contained in the housing, and centrifugal force causes the lubricant clinging to the surface of the gear to be thrown radially outward. Formed in the casing are several lubricant ports 110 and 112, which carry lubricant from the radially outer regions adjacent to the bevel gear and pinion 46, 48 radially inward toward chambers 114, 116, which are provided with oil seals at the axially outer ends thereof. Fitted between the inner surface of the bearing adjustment nuts 64, 66 and the outer races of bearings 60, 62 are disks 118, 120 which act as baffles to prevent the free flow of lubricant from chambers 114, 116 through the bearings. The baffles allow lubricant to flow into recesses 122 formed in the axleshafts, and these recesses communicate with helical slots 126, 128 formed in a slotted portion of the axleshafts and extend axially between recesses 122 and an inner recess 124. Lubricant is pumped in the helical slots 126, 128 from recesses 122 to recesses 124 when the axleshafts rotate in the direction that is consistent with forward motion of the vehicle. Oil flows from recesses 124, to a center chamber 130 through the splines formed on portions 72, 74 of the axleshafts in a space provided for the oil flow by intentionally leaving one or more teeth of the splines missing for this purpose. Centrifugal force carries the oil radially outward between the adjacent faces of the inner races 76, 78 from recesses 124, through clearance spaces located between the outer surface of the inner races 76, 78 and the inner surface of bevel gear 48. Similarly passage 140 carries fluid from the adjacent recess 124 to the face of ground connector 90.

Oil flows from chamber 114 around the inner edge of baffle disk 118 and through bearing 60 as well as being pumped from recess 122 to recess 124. Oil that flows through bearing 60 is prevented by baffles 132 and 134 from being thrown radially outward by centrifugal force. Baffle 132 is bolted to the inner end of bearing adjustment nut 64 and baffle 134 is bolted to the axially outer surface of gear 48. These baffles overlap but provide a clearance space between them that allows at least a portion of the oil that passes through bearing 60 to flow between the baffles outward toward the entrance to passage 110. However, a major portion of the oil that passes through bearing 60 is directed by the undersurface of the baffles through passage 136 and through the spaces between the roller-cage assembly. Similarly, the oil in chamber 130 which passed through the spline portions 72, 74 and between the adjacent axial faces of the inner races 76, 78 flows outward axially through the cage-roller assembly and through opening 138 formed in the ground connector. Oil flowing through passage 138 wets the inner surface of the ground connector 90, particularly the surface on which springs 86 make contact, and keeps the inner surface lubricated. Centrifugal force then carries lubricant radially outward into the area where the fluid can re-enter the passage 112 and recirculate through the clutch.

The helical recesses 126, 128 formed on the first and second rear axleshafts are approximately 0.030 inches wide and between 0.020 and 0.030 inches deep. This size has been found sufficient to carry fluid at a preferred flow rate through the interior regions of the clutch.

In operation with the vehicle traveling forward and straight ahead, the relative position of the outer race 78, roller 82, cage 88, its apertures 87, and the inner race 78 is shown in FIG. 3A. In this driving condition, the inner race is rotating faster than the outer race due to the driveline gear ratio between the front axleshaft and rear differential. Solenoid 96 connects the ground connector 90 to the casing when the winding of the solenoid is not energized because then compression spring 98 biased pin 102 between the teeth 94 of the ground connector. Spring arms 86 of the race 88 produce a drag force due to its contact with the nonrotating ground connector. This force causes the cage to make light contact on one side of rollers 82 and in this way to hold the rollers in contact with the outer race at 150 and in contact with the inner race at 152. However, because the inner race is rotating faster than the outer race, there is no power transmitted through the clutch although the roller is held in contact with the surface of the races. Power would be transmitted between the outer race and inner races if the speed of the outer race were increased relative to that of the inner race. For example, if the front wheels should slip on the road surface, the speed of the outer race can increase to the speed of the inner races 76, 78, to which the rear axleshafts are connected. When this occurs, power is transmitted from the outer race through the rollers to the inner races and to the rear axleshafts. Similarly, when the vehicle is turning, if the front drive wheels should slip on the road surface, power is transmitted to the inner rear wheel when the speed of the outer race equals the speed of the inner race that is associated with the inner rear wheel.

Figure 3B:
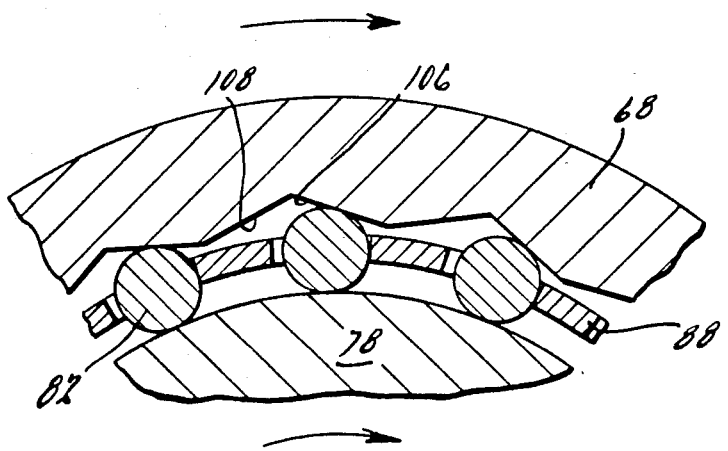
FIG. 3B is a cross section taken similarly to that of FIG. 3A but showing the components of the clutch in position for reverse drive.
Figure 3C:
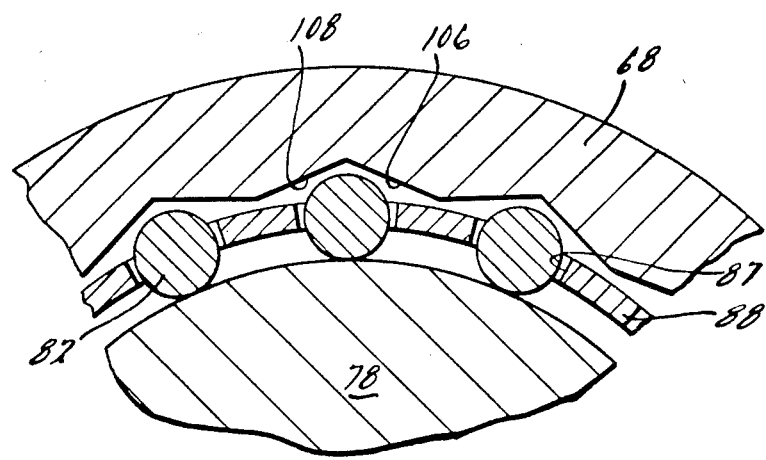
FIG. 3C shows the clutch components in the neutral position they assume when the solenoid pin disengages the ground connector.
Figure 4:
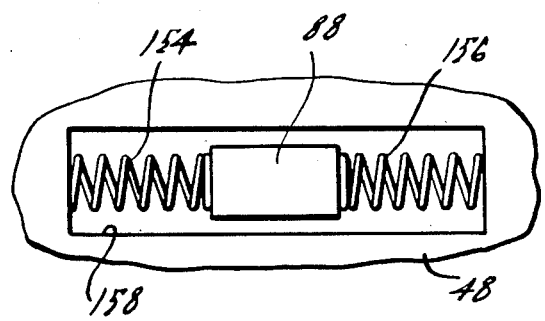
FIG. 4 is a partial cross section taken at plane IV—IV of FIG. 2.

If the vehicle were stopped after driving forward, the elements of the clutch would be in the position shown in FIG. 3B. Then, if the vehicle were driven backward, the inner race would transmit power to the outer race; consequently, the front wheels would be driven faster than the rear wheels because the gear ratio of the bevel pinion-gear system is such that the outer race of the clutch turns slower than the inner race when the front and rear wheels turn at the same speed. Therefore, when the inner race drives the outer race, the front wheels will scrub on the road surface because they are driven at a faster rotational speed than the speed of the rear wheels.

In order to avoid this problem, the drive mechanism according to the present invention includes two compression springs 154, 156, each contacting opposite facing surfaces of apertures 158 formed in bevel gear wheel 48 at diametrically opposite sides of the rear axleshaft axis. In this way, when there is no drag force on the cage 88, as is normally produced by the sliding action of the spring elements 86 of the cage against the surface of the ground connector 90, the springs 154, 156 bias the cage to the neutral position shown in FIG. 3C where the rollers are moved away from the inclined ramp surfaces formed on the inner surface of the outer race 68. The frictional force resulting from the contact of the spring elements in contact with the ground connector tends to oppose the biasing action of the springs 154, 156 toward the neutral position. However, the solenoid is energized whenever the shift indicator is placed in the neutral position as it would be in an automatic transmission or a manual transmission when gear ratio changes are made from a forward drive to a reverse drive position. When the solenoid is energized, the ground connector is disconnected from engagement with the casing of the drive mechanism. Therefore, the ground connector is free to rotate so that there is no drag load in this condition on the cage tending to oppose the action of springs 154, 156 and the cage is therefore able to be moved by these springs to the neutral position.

Having described a preferred embodiment of my invention, what I claim and desire to secure by U.S. Letters Patent is:

1. A system for circulating lubricating oil in a clutch drive mechanism comprising:
    a casing adapted to hold a reserve volume of oil, defining a space in which the drive mechanism is located, having a radially directed oil passage;
    an axleshaft rotatably supported on the casing extending outward from the casing, having an oil pumping portion located within the casing that includes multiple helical grooves formed on the outer surface of the axleshaft, adapted to pump oil along the axleshaft as it rotates;
    a first chamber communicating with the casing oil passage surrounding the axleshaft and located adjacent the pumping portion;
    a bearing fitted within the casing; and
    a member mounted for rotation about the axis of the axleshaft for rotation relative to the axleshaft, extending into and passing through the oil reserve within the casing as said member rotates, having a first surface on which the bearing is mounted and a second surface on which the pumping portion of the axleshaft is journalled, whereby oil is pumped axially along the pumping portion from the first chamber and lubricates the surface on which the pumping portion is journalled.

2. The system of claim 1 further comprising:
    first baffle means located between the bearing and the first chamber for partially restricting the flow of oil from the first chamber to the bearing;
    second baffle means located on the axially opposite side of the bearing from that of the first baffle means, having a first axially extending flange mounted on the casing and a second flange overlapping the first flange mounted on the rotating member, the baffles providing a restriction therebetween that impedes the radial outward flow of oil that passes through the bearing and directing said oil flow axially inward from the bearing.

3. The system of claim 2 further including:
    a passage formed in the rotating member adjacent the second baffle means through which oil from the bearing flows to the axially opposite side of the rotating member; and
    a clutch having an outer race connected to the rotating member, an inner race driveably connected to the axleshaft inboard of the pumping portion, and rollers located between the outer and inner races inboard of the rotating member and adjacent the passage formed in the rotating member, whereby oil is directed through said oil passage and through the space between the inner and outer races.

4. The system of claim 1 further comprising:
    a clutch having an inner race driveably connected to the axleshaft inboard of the pumping portion, an outer race surrounding the inner race providing an annular space therebetween, the inner race and rotating member forming an oil passage therebetween that connects the inboard end of the pumping portion with the space between the outer race and the inner race.

5. The system of claim 4 wherein the inner race of the clutch is driveably connected by spline teeth to the outer surface of the axleshaft, an oil passage formed between the inner race and the axleshaft by missing spline teeth, whereby oil pumped from the pumping portion is carried through said oil passage.

6. A system for lubricating a clutch drive mechanism comprising:
   a casing adapted to hold a reserve quantity of oil, defining a space within which the drive mechanism is housed having a first radially directed oil passage;
   an axleshaft rotatably supported on the casing and extending outward from the casing, having an oil pumping portion located within the casing in the form of helical grooves on its outer surface, adapted to pump oil along the axleshaft as it rotates, one axial end of the pumping portion communicating with the first oil passage;
   a ground connector;
   a first member mounted for rotation about the axis of the axleshaft having a surface adjacent the surface of the pumping portion of the axleshaft on which the helical grooves are formed, extending into and passing through the oil reserve within the casing as said member rotates, having a surface on which the ground connector is journalled; and
   a second oil passage communicating the end of the pumping portion that is axially opposite the end of the pumping portion that communicates with the first oil passage with the surface on which the ground connector is journalled, whereby oil is pumped axially across the pumping portion and through the second oil passage.

7. The system of claim 6 further comprising:
   a clutch having an outer race driveably connected to the rotating member, an inner race located within the outer race, rollers located between the outer and inner races and a cage within which the rollers are retained having an arm resiliently biased into contact with the ground connector; and
   a driving connection between the axleshaft and the inner race located adjacent the inboard end of the pumping portion including mating spline teeth formed on the outer surface of the axleshaft and on the inner surface of the inner race, having at least one missing spline tooth that provides a passage through which oil exiting the pumping portion can flow axially inward.

8. A system for lubricating a clutch drive mechanism comprising:
   a casing adapted to hold a reserve volume of oil defining a space in which the drive mechanism is located and having radially directed oil passages located at opposite sides of the casing;
   first and second axleshafts rotatably supported on the casing and extending outward from the casing, each axleshaft having an oil pumping portion located within the casing that includes at least one helical groove on the outer surface of the axleshaft adapted to pump oil along the pumping portion as the axleshaft rotates, the outer axial end of the pumping portion hydraulically communicating with an oil passage in the casing;
   first and second bearings fitted within the casing;
   a first rotating member mounted for rotation about the axis of the axleshafts extending into the reserve oil volume within the casing, having a first surface on which the first bearing is mounted and a second surface on which the pumping portion of the first axleshaft is supported; and
   a second rotating member mounted for rotation about the axis of the axleshafts having a first surface on which the second bearing is mounted and a second surface on which the pumping portion of the second axleshaft is supported;
   whereby oil pumped axially along the pumping portion lubricates the outer surfaces of the pumping portions and the surfaces of the first and second rotating members on which the pumping portions are supported.

9. The system of claim 8 further comprising:
   first and second baffle means located adjacent the first and second bearings for partially restricting hydraulic communication between the ends of the pumping portions of the first and second axleshafts that communicate with the oil passages of the casing and the first and second bearings, respectively.

10. The system of claim 8 further comprising third baffle means located on the axially opposite side of the bearing from that of the first baffle means, having a first axially extending flange mounted on the casing and a second flange overlapping the first flange mounted on the first rotating member for at least partially restricting the radially outward flow of oil that passes through the bearing and directing said oil flow axially inward from the bearing.

11. The system of claim 10 further comprising:
   an oil passage formed in the first rotating member adjacent the third baffle means, hydraulically connecting the axially inner end of the first bearing with the axially inner side of the first rotating member; and
   a clutch having an outer race driveably connected to the first rotating member, first and second inner races driveably connected inboard of the pumping portions to the first and second axleshafts, respectively, and rollers located between the outer and inner races inboard of the first and second rotating members and adjacent the oil passage of the first rotating member;
   whereby oil is directed through said oil passage and through the space between the inner and outer races.

12. The system of claim 8 further comprising:
   a clutch having first and second inner races driveably connected inboard of the pumping portions to the first and second axleshafts, respectively, an outer race surrounding the inner race and defining an annular space therebetween, the first and second inner races and first and second rotating members, respectively, forming oil passages therebetween that hydraulically connect the inboard ends of the pumping portions of the first and second axleshafts with the space between the outer race and inner races.

13. The system of claim 12 further comprising spline connections between the first and second races of the clutch and the first and second axleshafts, respectively, each connection having at least one missing spline tooth that provides an oil passage between the respective races and axleshafts for communicating the oil outlet end of the pumping portions with the axially inner portions of the axleshafts.

14. The system of claim 12 further comprising a ground connector journalled on the second rotating member, and wherein the second rotating member has an oil passage communicating the oil outlet end of the pumping portion of the second axleshaft with the journalled surfaces of the second rotating member and ground connector.

* * * * *